United States Patent [19]

Fima

[11] 4,201,974
[45] May 6, 1980

[54] BRAKE APPARATUS WITH AIR ACTUATED REMOTE WEAR INDICATOR

[75] Inventor: Raoul G. Fima, Van Nuys, Calif.

[73] Assignee: Jumpak Products Inc., Anaheim, Calif.

[21] Appl. No.: 828,817

[22] Filed: Aug. 29, 1977

[51] Int. Cl.² ............................................. B60Q 1/44
[52] U.S. Cl. .................................. 340/52 A; 116/208; 188/1 A; 200/61.4
[58] Field of Search ..................... 340/52 A, 240, 626; 200/61.4; 188/1 A; 116/114 Q, 208

[56] References Cited

U.S. PATENT DOCUMENTS

| | | | |
|---|---|---|---|
| 3,088,549 | 5/1963 | Borsa | 340/52 A |
| 3,560,919 | 2/1971 | Uribe | 340/52 A |
| 3,593,266 | 7/1971 | Van Sickle | 340/52 A |

Primary Examiner—John W. Caldwell, Sr.
Assistant Examiner—Joseph E. Nowicki

[57] ABSTRACT

A brake apparatus having a friction pad riveted to a brake shoe and an air conduit recessed within the pad and positioned within its working thickness. As the pad is gradually worn away, the conduit is interrupted by the formation of an opening therein before the rotor can be scored by the rivets. A remote indicator, which may be mounted on the instrument panel of a vehicle, is then responsive to a change in air pressure within the conduit to signal the need for pad replacement.

6 Claims, 7 Drawing Figures

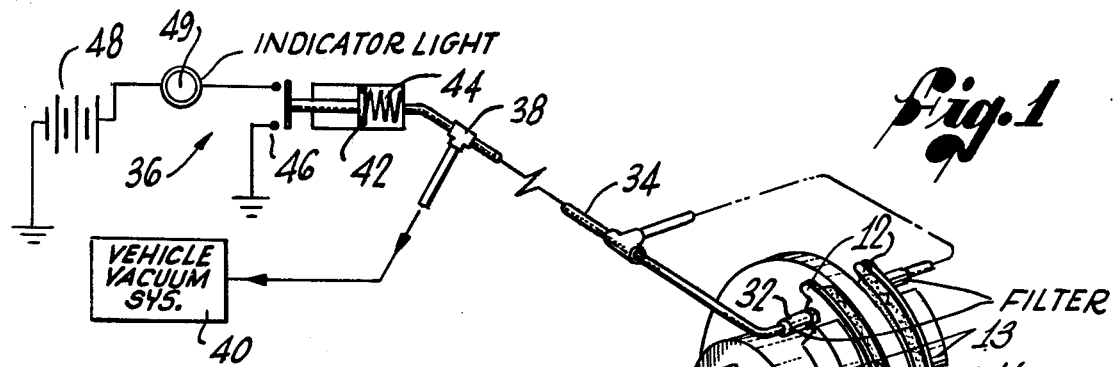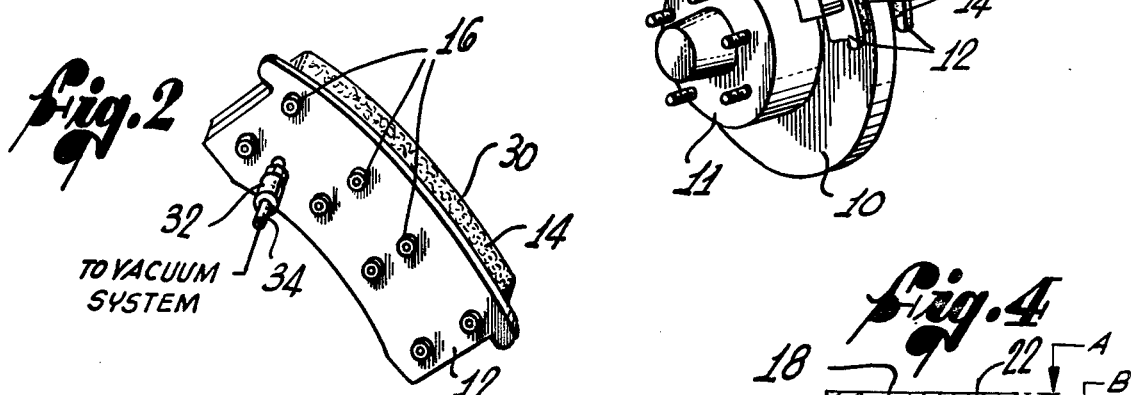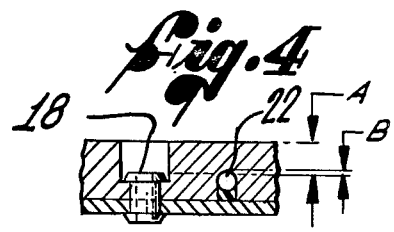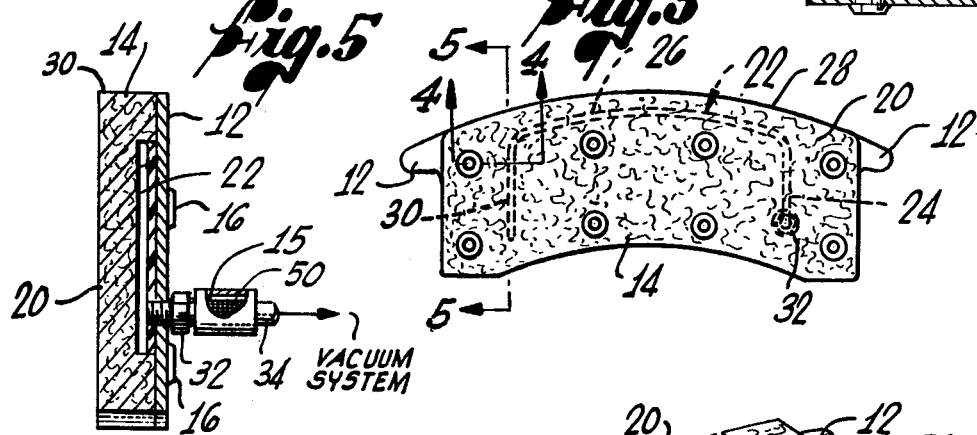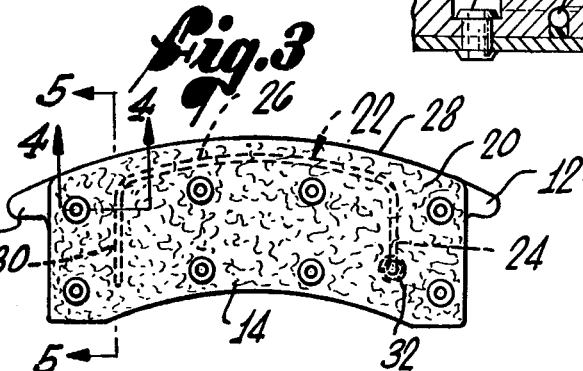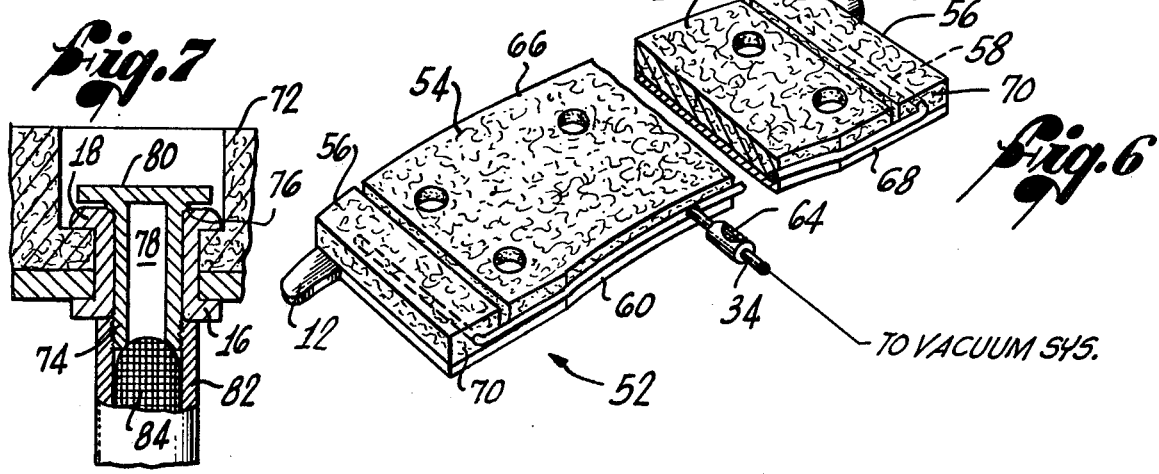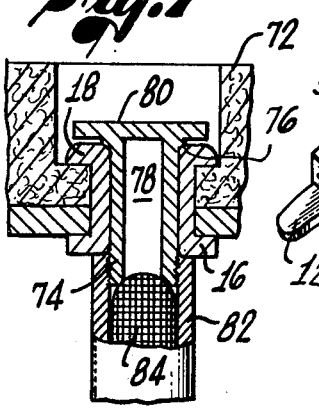

BRAKE APPARATUS WITH AIR ACTUATED REMOTE WEAR INDICATOR

BACKGROUND OF THE INVENTION

The present invention relates to brakes, and more particularly to a brake apparatus that provides a remote indication of the need to replace friction pads.

Brakes of the type used on automobiles, aircraft and other vehicles employ high friction brake pads attached by rivets to shoes which are connected to the vehicle frame so they cannot rotate. When the brake is applied, the shoe is moved to engage a smooth metal member in the form of a disk or drum that rotates with a wheel of the vehicle. The friction between the stationary pad and the rotating member provides the braking force. The friction surface of the pad is gradually worn away until the pad has been consumed and must be replaced.

If expensive repairs are to be avoided, it is imperative that the pads be replaced before they are worn to the point at which the rivets contact and score the rotatable member. The life expectancy of a pad may be predicted, within broad limits, based on the wear resistance of the material of which it is made and the working thickness between its original friction surface and the heads of the rivets. Nevertheless, variations in individual driving habits make accurate prediction of replacement intervals impossible. Most vehicles, therefore, require frequent visual inspection of pads, which is a time-consuming and inconvenient process, to guard against brake damage. Failure to inspect brake pads with sufficient frequency is not unusual.

It is, therefore, highly desirable to provide a remote indicator responsive to the need to replace brake pads, preferably providing an instrument panel display, to eliminate the need for brake pad inspection. Various arrangements have been proposed to this end. One such arrangement, described in U.S. Pat. No. 3,869,695, to Kita, utilizes an electrical wire embedded in the pad and protruding above the level of the rivets so that it is severed by the action of a disk or rotor before the rotor contacts the rivets. An electronic circuit is responsive to the severance of this wire to produce an indication that the pad should be replaced.

An objective of the present invention is to provide an improved remote brake-pad-wear indicator of simple construction that does not require the expense and weight of copper wire extending from each brake to the location where the indication is to be displayed. Another objective of the invention is to provide a remote wear indicator that is highly effective and reliable despite any misalignment between the friction pad and the rotatable member by which it is engaged.

SUMMARY OF THE INVENTION

The present invention provides an uncomplicated brake apparatus for motor vehicles that utilizes an air actuated remote indicator to signal the need to replace brake pads. The indicator is connected to an air conduit recessed within the friction pad and extending parallel to a rotatable member, such as the rotor of a disk brake. As the pad is gradually worn away, the rotatable member eventually reaches an interruption level at which it causes a break or opening in the conduit. Since the conduit is normally maintained at an air pressure either below or above atmospheric pressure, the interruption causes a change in pressure within the conduit, and the indicator is responsive to this change.

The interruption level defined by the conduit is located between the friction surface of the unused pad and the level at which the rotating member would be damaged by the rivets that attach the pad. A reserve thickness, between the interruption level and the level of the rivets, remains after an indication of the need for pad replacement has been given, allowing time for the pads to be replaced conveniently before expensive brake damage occurs.

The warning apparatus of the invention can be installed in many motor vehicles with minimum expense because these vehicles already include a vacuum system for operating various controls such as heating and air conditioning vents. An air line leading from the conduit to the remote indicator is simply connected to the existing vacuum system so that minimal air pressure exists in the line prior to the interruption of the conduit. An air filter is provided to protect the air line and vacuum system from foreign particles that may be dislodged from the sides of the conduit and other contaminating materials that may be drawn into the conduit once it is interrupted. This filter is contained within a fitting by which the conduit is connected to the air line to insure that the filter will be replaced along with the pad.

Because the friction surface of a brake pad is not always properly aligned with the rotatable brake member, there is a danger that an air conduit confined to an isolated area of the pad would fail to detect wear until rivets in a different area of the pad had caused damage. For this reason, one form of the invention uses a conduit that extends substantially across the pad in two perpendicular directions. An alternative arrangement, particularly suitable for use with disk brakes, utilizes an elongated, arcuate main section of conventional construction and two relatively narrow pieces disposed at opposite ends of the main section. The conduit then has two branches, each of which extends through one of the end pieces in a direction that is radial with respect to the rotor.

Another embodiment of the invention utilizes inserts extending through hollow rivets that hold the pad to the brake shoe. An air conduit formed in each insert projects into the working thickness of the pad so that the inner end of the conduit is interrupted as the pad is worn, causing a change in pressure and triggering an indicator.

Other features and advantages of the present invention will become apparent from the following detailed description, taken in conjunction with the accompanying drawings, which illustrate, by way of example, the principles of the invention.

BRIEF DESCRIPTION OF THE DRAWINGS

FIG. 1 shows an exemplary brake apparatus embodying many novel features of the present invention, a portion of the apparatus being shown pictorially, while the indicator and vacuum system are shown schematically;

FIG. 2 is an enlarged perspective view of the friction pad and brake shoe of the apparatus;

FIG. 3 is an enlarged, plan view of the pad and shoe showing the friction surface of the pad;

FIG. 4 is an enlarged, fragmentary, sectional view of the pad and shoe taken substantially along the line 4—4 of FIG. 3;

FIG. 5 is an enlarged, sectional view of the pad and shoe taken substantially along the line 5—5 of FIG. 3;

FIG. 6 is a partially broken away, perspective view of an alternative pad and shoe arrangement constructed in accordance with the invention; and FIG. 7 is a fragmentary, sectional view of a another pad and shoe arrangement constructed in accordance with the invention.

DESCRIPTION OF THE PREFERRED EMBODIMENT

An exemplary brake apparatus, illustrated in FIGS. 1 through 5 of the accompanying drawings, embodies many novel aspects of the present invention. It is a disk brake including a disk-like, metal rotor 10 attached to a wheel 11 of a motor vehicle for rotation with the wheel, and a pair of brake shoes 12 connected to the vehicle frame (not shown) and arranged one on either side of the rotor, as shown in FIG. 1. When the brake is applied, a brake actuating mechanism 13 causes the brake shoes 12 to move axially toward the rotor 10, clamping the rotor between the shoes and providing the desired retarding force. Actual contact with the rotor 10 is made by friction pads 14, each attached to one of the shoes 12 by a plurality of rivets 16, as shown in FIGS. 2, 3 and 4.

The rivets 16 are recessed within the brake pads 14 to avoid contact with the rotor 10, and the distance between the rivet heads 18 and the flat friction surfaces 20 of the pads defines working thicknesses "A," as indicated in FIG. 4. The friction surfaces 20 are, of course, subject to wear, and it is necessary, in this conventional brake construction, to replace each pad 14 before its entire working thickness has been consumed and the rivets 16 contact the rotor 10, causing it to be stored and requiring expensive repairs.

The invention includes a unique provision for indicating to the operator of the vehicle the need to replace the brake pads 14. As shown in FIGS. 3, 4 and 5, an air conduit 22 is molded into the friction pad 14 where it extends parallel to the friction surface 20. The conduit 22 is circular in cross section and has a generally U-shaped configuration. It has a straight first leg 24 extending in a generally radial direction along one end of the pad 14, a curved second leg 26 extending generally perpendicular to the first leg along an arcuate outer edge 28 of the pad and circumferentially with respect to the rotor 10, and a straight third leg 30 extending back from the second and parallel to the first along the opposite end of the pad (FIG. 3). The extension of the conduit 22 over a substantial portion of the pad 14 in two generally perpendicular directions insures that, regardless of any misalignment of the pad with respect to the rotor 10, the conduit will be interrupted by the wear of the pad before the rivets 16 in any area of the pad can contact and score the rotor.

As shown most clearly in FIG. 4, the interruption level of the conduit 22, while closer to the rivets 16 than to the friction surface 20, is nevertheless spaced from the rivets so as to define a reserve thickness "B" at the bottom of the working thickness "A." This reserve insures that, at the time the indication of a need for pad replacement is given, there remains a sufficient opportunity for the operator of the vehicle to seek convenient replacement of the pad 14 before damage to the rotor 10 occurs.

At one end of the conduit 22 is an annular fitting 32 by which it is connected to a small diameter, flexible air line 34 leading to a pressure sensitive indicator 36 (FIG. 1) on the instrument panel (not shown) of the vehicle. A T-connection 38 allows the air line 34 to communicate with the vacuum system 40 of the vehicle, this system being present in many vehicles for other purposes such as the operation of heating and air conditioning vents and the rotation of hide-away head lamp mountings.

Air pressure within the conduit 22 and the air line 34 is normally maintained by the vacuum system 40 at a minimal level substantially below that of atmospheric pressure. However, once the brake pad 14 has been worn away to the extent that the conduit 22 is interrupted by the formation of an opening in its walls, air is drawn into the line 34 and the indicator 36 responds by displaying an illuminated visual indication of the need to replace the pad 14.

In the exemplary indicator arrangement 36 shown in FIG. 1, atmospheric pressure normally urges a piston 42 toward the conduit 22, thereby compressing a bias spring 44. As the pressure within the line 34 approaches atmospheric pressure due to an interruption in the conduit 22, the spring 44 pushes the piston 42 outwardly closing a switch 46 to complete a circuit to the vehicle battery 48 and illuminate an indicator light 49.

It should be noted that, when each wheel is equipped with two cooperating pads 14, the air line 34 may be connected to both pads so that a single indicator light 49 is associated with each wheel. This arrangement is generally satisfactory since all pads at one wheel are usually replaced at one time.

To prevent the vacuum system 40 from being clogged by foreign matter that might break away from the walls of the conduit 22 or be drawn into the conduit once it is interrupted, a paper air filter 50 is disposed within the fitting 32 which is permanently bonded to the pad 14, as shown in FIG. 5. When a worn pad 14 is replaced, the old filter 50 is automatically replaced along with it since it actually forms a permanent part of the pad and shoe structure.

An alternative friction pad construction 52, shown in FIG. 6, utilizes a conventional arcuate pad as a main section 54 with two narrow elongated end pieces 56 epoxied to its opposite ends so that the end pieces are oriented in a generally radial direction with respect to the rotor 10. This three-piece pad 52 is secured to a shoe 12 and employs the disk brake apparatus of FIG. 1 in generally the same manner as the one-piece pad 14 (corresponding components being designated by the same reference numbers used above with reference to FIGS. 1–5).

Each end piece 56 has an air conduit branch 58 extending across the pad 52 in a direction substantially aligned with a radius of the rotor 10 and terminating within the pad. The branches 58 are connected by an exterior conduit section 60 to a common fitting 62 which contains a paper air filter 64 and is connected by the air line 34 to the vehicle vacuum system 40. As in the case of the pad 14 described above, the conduit branches 58 are closer to the heads 18 of the plurality of rivets 16 (not shown in FIG. 6) that secure the main section 54 to a brake shoe 12 than they are to the friction surface 20, so that the conduit defines a reserve thickness.

It should be noted that misalignment of the three-piece pad 52 will not prevent early detection of the need for pad replacement since one or both of the conduit branches 58 will nevertheless be interrupted before the rivets 16 contact the rotor 10. If one end of the pad 52 is worn more quickly than the other, the branch 58 at the worn end will be interrupted first, whereas if the top 66 or bottom 68 of the pad is worn more quickly, then the appropriate ends of the branches will be interrupted.

The construction of the three-piece pad 52 is advantageous from a manufacturing viewpoint, since only the relatively small end pieces 56 need to specially fabricated to accommodate the conduit branches 58. Formation of the branches 58 is easily accomplished since they extend in straight lines and each emerges at one end surface 70 of its end piece 56.

Another embodiment of the invention, interchangeable with the pad 14 and shown in FIG. 7, utilizes one of the conventional rivets 16, which is hollow having an axial passage therethrough, to provide access to the interior of the pad 72. A generally cylindrical insert 74, made of the same material as the pad 72, extends through the center of the rivet 16 where it is retained by an annular flange 76 that engages the shoe 12 on the side closest to the shoe 12. An air conduit 78 extends axially through the insert and into the pad 72 to an interruption level at its inner end 80 that is within the working thickness of the pad and above the heads 18 of the rivets 16. The exposed end of the insert 74 carries a fitting 82, housing an air filter 84, for connection to the air line 34.

As many of the rivets 16 as desired may be provided with inserts 74, the air lines 34 from the various inserts being interconnected. It is preferable to use at least two inserts 74 located at diagonally opposite corners of each pad 72 to insure reliable detection of the need to replace the pad despite any misalignment between the pad and the rotor 10.

In summary, the invention provides a simple, inexpensive and lightweight apparatus that reliably indicates the need to replace worn brake pads 14, 52 or 72 giving advanced warning so that the pads can be replaced conveniently before damage to the rotor 10 occurs. While a particular form of the invention has been illustrated and described, it will be apparent that various modifications can be made without departing from the spirit and scope of the invention.

I claim:

1. A brake apparatus including a rotatable member connected to a wheel of a vehicle for rotation therewith, a non-rotatable brake shoe disposed adjacent said rotatable member, means for moving said brake shoe toward said rotatable member to apply a braking force to said wheel, a friction pad having a predetermined working thickness and subject to wear, and means for securing said pad to said shoe, wherein the improvement comprises:

an aperture in said pad;

an aperture in said shoe aligned with said aperture in said pad;

an insert at least as subject to wear as said pad disposed within said apertures, said insert having a closed end defining an interruption level at which said rotatable member will form a hole therein as said pad wears, said interruption level being within said working thickness, an air conduit one end of which is attached to said insert so that said insert forms a closed end on said conduit;

means for normally maintaining said conduit at an air pressure level different from atmospheric pressure; and indicator means connected to said conduit for producing a visible indication of the need to replace said pad in response to a change in air pressure in said conduit.

2. The brake apparatus of claim 1 wherein said insert is made of the same material as said pad.

3. The brake apparatus of claim 1 further comprising an air filter disposed at the connection of said conduit to said insert.

4. A brake apparatus including a rotatable member connected to a wheel of a vehicle for rotation therewith, a non-rotatable brake shoe disposed adjacent said rotatable member, means for moving said brake shoe toward said rotatable member to apply a braking force to said wheel, a friction pad subject to wear, and a plurality of rivets by which said pad is attached to said shoe for engagement with said rotatable member, at least one of said rivets having an opening extending axially through the center thereof, said rivets being recessed within said pad away from said rotatable member to define a working thickness of said pad so that said rivets can contact said rotor only after said working thickness has been removed by wear, wherein the improvement comprises:

an insert at least as subject to wear as said pad disposed within said opening in one of said rivets, said insert having a closed end defining an interruption level at which said rotatable member will form a hole therein as said pad wears, said interruption level being within said working thickness;

an air conduit, one end of which is attached to said insert so that said insert forms a closed end on said conduit;

means for normally maintaining said conduit at an air pressure different from atmospheric pressure; and indicator means connected to said conduit for producing an indication of the need to replace said pad in response to a change in air pressure in said conduit.

5. The brake apparatus of claim 4 wherein said insert is made of the same material as said pad.

6. The brake apparatus of claim 4, further comprising an air filter disposed at the connection of said conduit to said insert.

* * * * *